United States Patent [19]
Kuo

[11] Patent Number: 5,189,794
[45] Date of Patent: Mar. 2, 1993

[54] PAIR OF SHEARS WITH TONGS

[75] Inventor: Long-Far Kuo, Taipei, Taiwan

[73] Assignee: Young-Life International Co., Ltd., Taipei, Taiwan

[21] Appl. No.: 807,994

[22] Filed: Dec. 16, 1991

[51] Int. Cl.$^5$ .................. B26B 13/00; B26B 13/16
[52] U.S. Cl. .................................. 30/135; 30/134
[58] Field of Search .................. 30/132, 134, 135; 7/134

[56] References Cited

U.S. PATENT DOCUMENTS

| | | | |
|---|---|---|---|
| 608,807 | 8/1898 | Tilden | 30/134 |
| 681,972 | 9/1901 | Postlethwait | 30/134 |
| 887,494 | 5/1908 | Mulertz | 30/135 |
| 1,151,874 | 8/1915 | Harris | 30/134 |
| 3,126,628 | 3/1964 | Popek | 30/134 |
| 3,287,751 | 11/1966 | Hoffman | 30/134 |
| 3,555,677 | 1/1971 | Cusato | 30/134 |
| 4,185,379 | 1/1980 | Amstutz | 30/134 |

FOREIGN PATENT DOCUMENTS 540106 12/1931 Fed. Rep. of Germany ........ 30/134

*Primary Examiner*—Douglas D. Watts
*Assistant Examiner*—Paul M. Heyrana, Sr.
*Attorney, Agent, or Firm*—Harrison & Egbert

[57] ABSTRACT

The structure of the shears with a tongs is that a shears overlaps a tongs. There are rivets at the end of the two handles of the two objects. The center hole of the shears cooperates with the round hole of the pivot. The hole of the overlapped parts of the tongs plates is elongated. That makes the tongs plates have more elastic space and move forward and backward in a slanting direction. The noses of the tongs propped by a tension spring can open outwards. When opening, the tongs using the ends of the handles as the axle center makes the shears open as well. Then, the noses of the tongs is a little smaller than that of the shears. When the handles of the shears are forced to clip inwards, the tongs also clips inwards. But when the noses clip the work piece, the noses stop and the edges of the shears keep cutting inwards. The tongs clips the work piece by the force of the tension spring. That the work piece does not fall down when being cut is its feature.

6 Claims, 4 Drawing Sheets

PAIR OF SHEARS WITH TONGS

BACKGROUND OF THE INVENTION

Nowadays there are many types of shears used to prune trees and flowers or to pick fruits. One of them is a kind of shears that can cut and clip stems, twigs, flowers and fruits at the same time. As the fiber tissue of stems and twigs is soft and elastic, this type of double-function shears uses a pair of bulky and wide tongs to clip the stems or twigs. As a result, this type of shears is bulky and heavy. To remove this shortcoming, the inventor develops a pair of tongs, composed of very few parts and with the thinnest structure, to let the user to cut and clip twigs, flowers and fruits conventiently.

PRIOR ART OF THE INVENTION

The prior art of the Mori, et al. reference U.S. Pat. No. 4,117,592, disclosed a garden tool that can retain the branch after the shear elements (1) and (2) had cut the branch. A compression spring was connected to and between the handles. The inventor also found the prior art of the Wallace, et al. reference U.S. Pat. No. 3,336,667, which disclosed a pruning cutter wherein the stem to be cut was initially constrained by a gripping flange (94) of a spring biased gripper element, and the rigid gripper element is on anvil. After the gripping engagement, the cutting blade (30) was moved downwardly through the work piece.

In view of the foregoing, it is respectfully requested that the applicant's newly submitted claims now define the applicant's invention in a manner not disclosed or suggested by the Mori reference or the Wallace reference, considered alone or in combination.

FIELD OF THE INVENTION

A pair of shears with tongs, which can perform cutting and clipping at the same time, is a modern product used to pick fruits or to prune trees and flowers. When it is used to pick apples, for example, you can hold it in one hand to cut the apple stem and to clip the apple by its stemp at the same time, allowing you to place the apple into your basket directly. You don't need to hold the apple with one hand and cut its stemp, with the shears, with the other hand.

SUMMARY OF THE INVENTION

The structure of the shears with a pair of tongs of this invention is a new design of its kind. The characteristics of its function are (1) light and convenient, (2) simple structure, (3) easy assembly, (4) super thin structure, and (5) direct trimming of the twigs left behind is allowed. The characteristics of its structure are (1) different pivots are used for the pairs of tongs and shears, (2) only one tension spring is used to let the tongs and the shears function simultaneously, and (3) the tension spring provides a clipping effect to the pair of tongs when the pairs of shears and tongs are clipping a work piece at the same time.

BRIEF DESCRIPTION OF THE DRAWINGS

The following drawings are attached to present the invention clearly for a better understanding of the Investigation Committee on the structure and operation of this invention.

Nomenclature
- (1) A pair of Shears
- (2) Pivot
- (3) A Pair of Tongs
- (4) Rivets
- (5) Tension Spring
- (6) Grips
- (11, 12) Shear Plates
- (111) Hole for Pivot
- (112, 122) Cutting Edges
- (113, 123) Handles of Shears
- (114, 124) Holes for Rivets
- (31, 32) Tong Plates
- (311, 321) Elongated Holes
- (312, 322) Clipping Tongs
- (313, 323) Handles of Tongs
- (314, 324) Holes for Rivets
- (315, 325) Pegs
- (51, 52) Ends of Tension Spring
- (61, 62) Protrusions of Grips

DETAILED DESCRIPTION OF THE PREFERRED EMBODIMENT

Figures 1, 3:
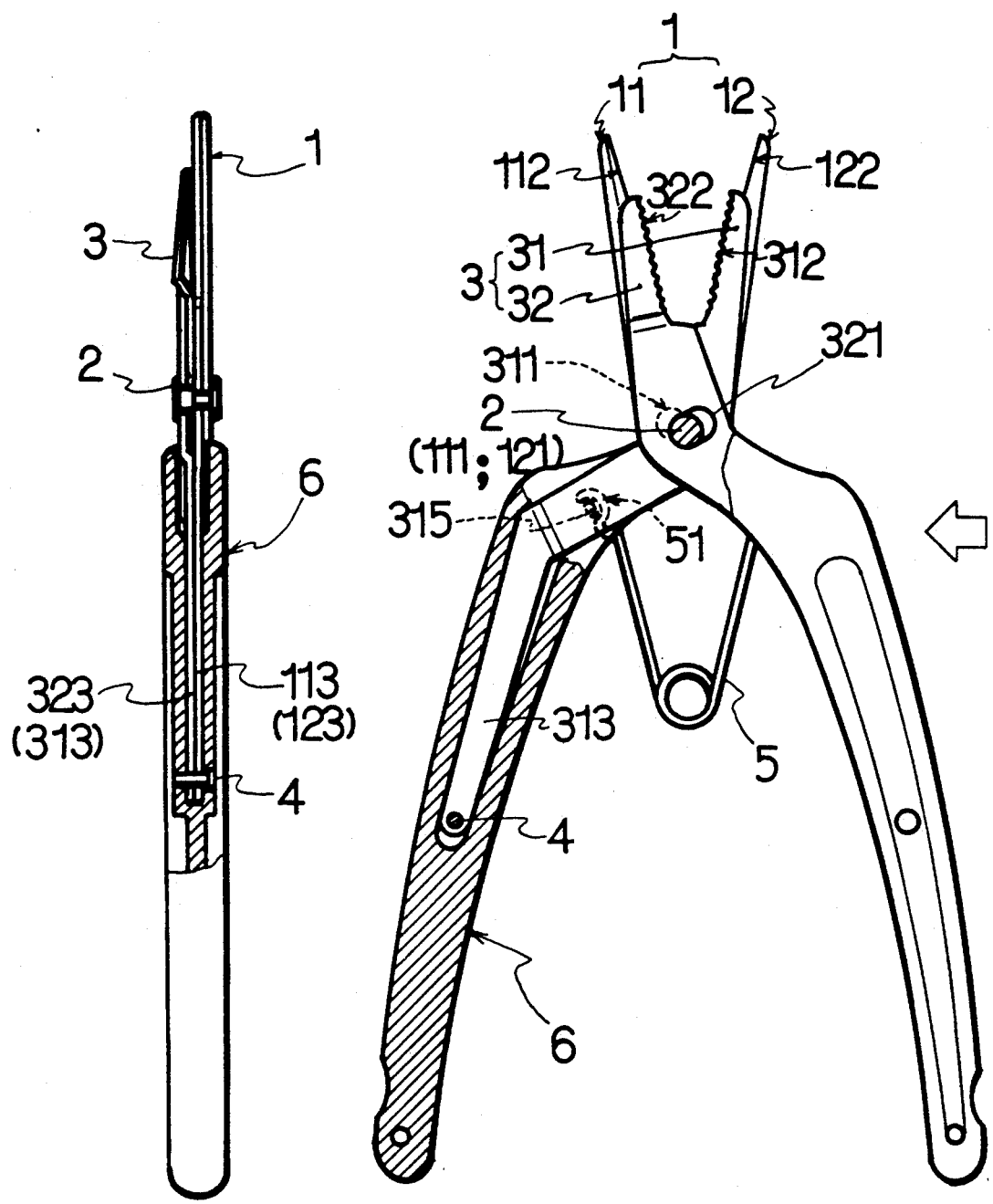
FIG. 1 is the entire and segmentary vertical view of this invention in open form.
FIG. 3 is the entire side view of this invention.
Figure 2:
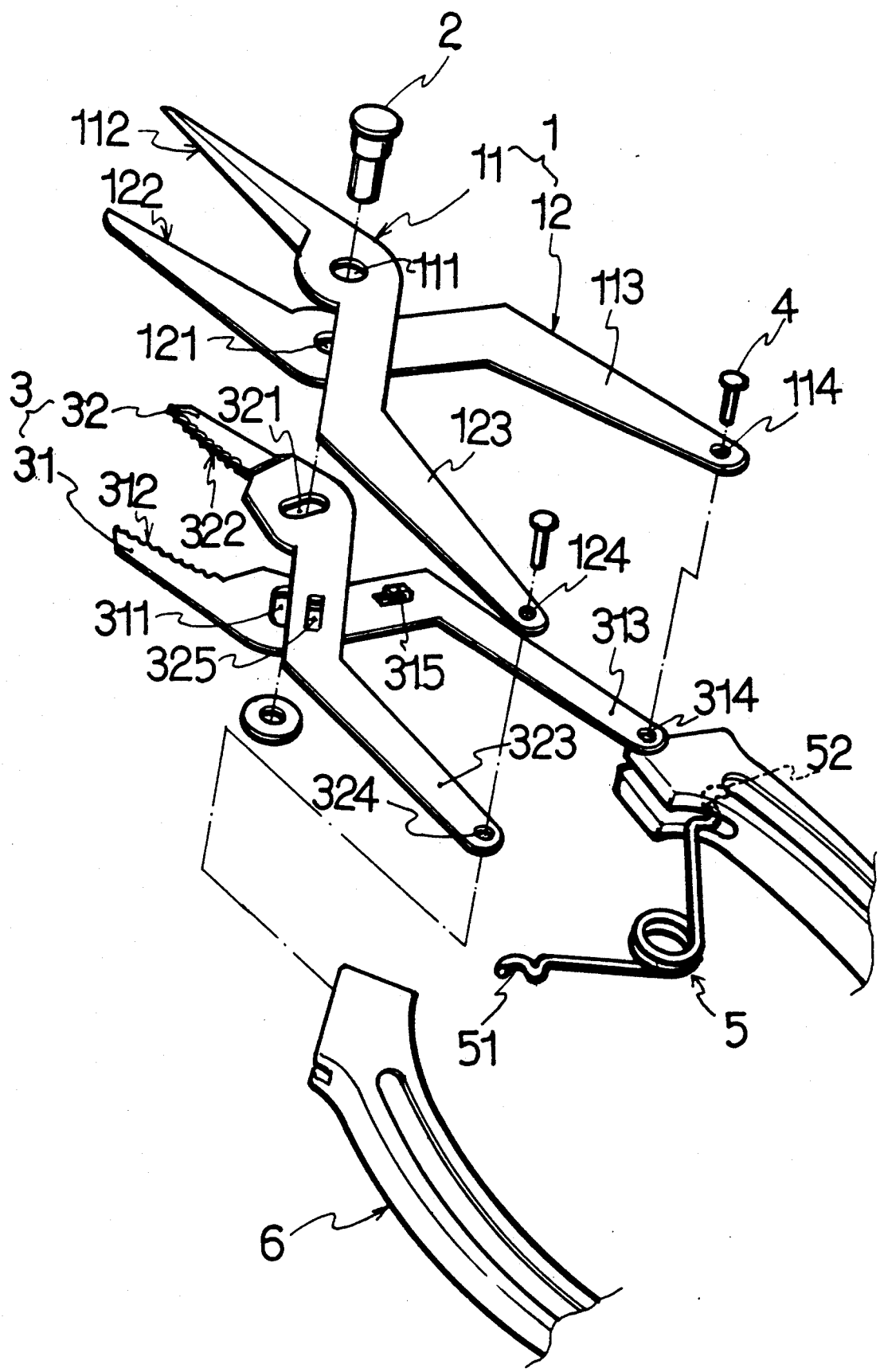
FIG. 2 is the 3-dimensional view of the decomposed parts of this invention.

As shown by FIG. 1 and FIG. 2, the pair of shears with tongs presented by this invention is formed by (1) a pair of shears and (3) a pair of tongs overlapped as one unit. The two handles (113, 313) of the shears and tongs are inserted into two grips (6), as shown by FIG. 3, designed for comfortable grip and beauty. The handle is not an important feature of the structure of this invention. The pair of shears uses two overlapping plates (11, 12), like an ordinary pair of shears, joined by a pivot (2) in the middle, with one section of the plates forming a pair of cutting edges (112, 122) and the other section of the plates forming a pair of handles (113, 123). Rivets (4) are driven into the holes for rivets (114, 124) on each plate of the handles, and used as the supporting axle of the tong plates (31, 32). Two elongated holes (311, 321) are made on the section of the overlapped tongs (3) coincided with the overlapped shears (1), and the pivot (2) of the shears goes through the two elongated holes (311, 321) to restrict the movement of the tong plates (31, 32) that are slightly bent to form the clipping tongs (312, 322). The handles of tongs (313, 323) have a pair of pegs (315, 325). The two ends (51, 52) of a tension spring (5) prop up the two pegs (315, 325) to make the pair tongs (3) stretch out and open. When the pair of tongs (3) is opened, the pair of shears (1) is also opened.

Figure 4:
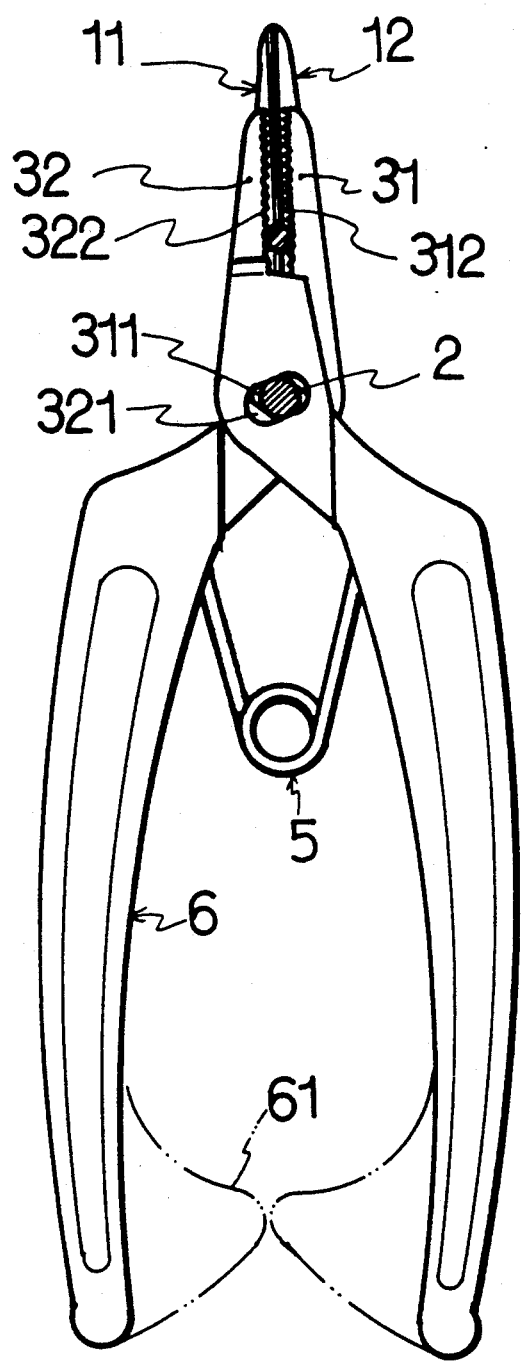
FIG. 4 is the entire view of this invention clipping a work piece.

When the cutting edges (112, 122) of the assembled pair of shears, as shown by FIG. 1, is opened to its maximum range, the tong plates (31, 32) receive the force directly from the tension spring (6). As the rivets (4) of the tong plates (31, 32) are driven into the holes (114, 124) at the ends of the handles of shears (113, 123), the external brims of the elongated holes (311, 321) move towards the pivot (2) to make the clipping tongs (312, 322) move earlier than the cutting edges (112, 122) of the shears. Because of this structure, the angle of the clipping tongs (312, 322) can be smaller than the cutting edges (112, 122) of the shears, allowing a firm grip of the twig before it is cut by the pair of shears. As shown by FIG. 4, the use of the elongated holes (311, 321) allows the cutting edges (112, 122) of the shears to continue moving inwards and cutting the twig after the clipping tongs (312, 322) grip the work piece (0). This is the most important feature for the structure of this invention. In addition, two opposite protrusions (61, 62) are made on the grips (6), as shown by FIG. 4, to set the position of the shears after the cutting edges (112, 122) is closed, so as to avoid excessive movement of the shears. This is a structure to make this invention more perfect. It goes without saying that there are many feasible ways for this structure.

Figure 5:
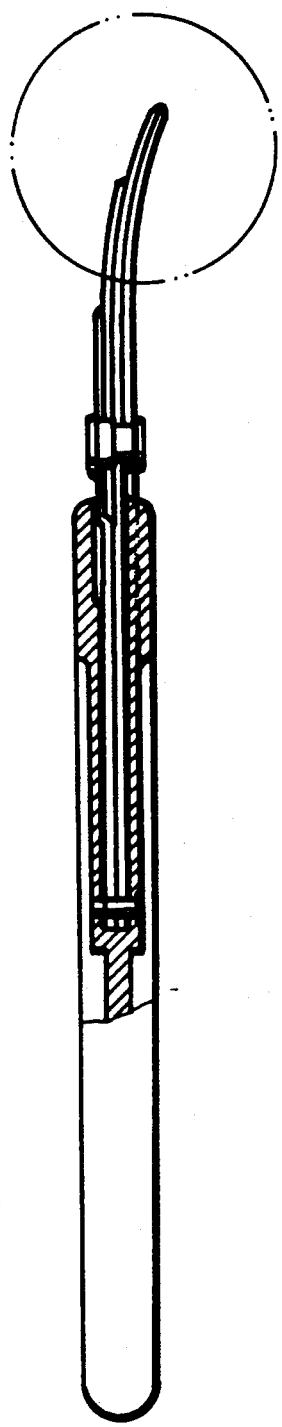
FIG. 5 is the side view of this invention clipping a work piece.
Figure 6:
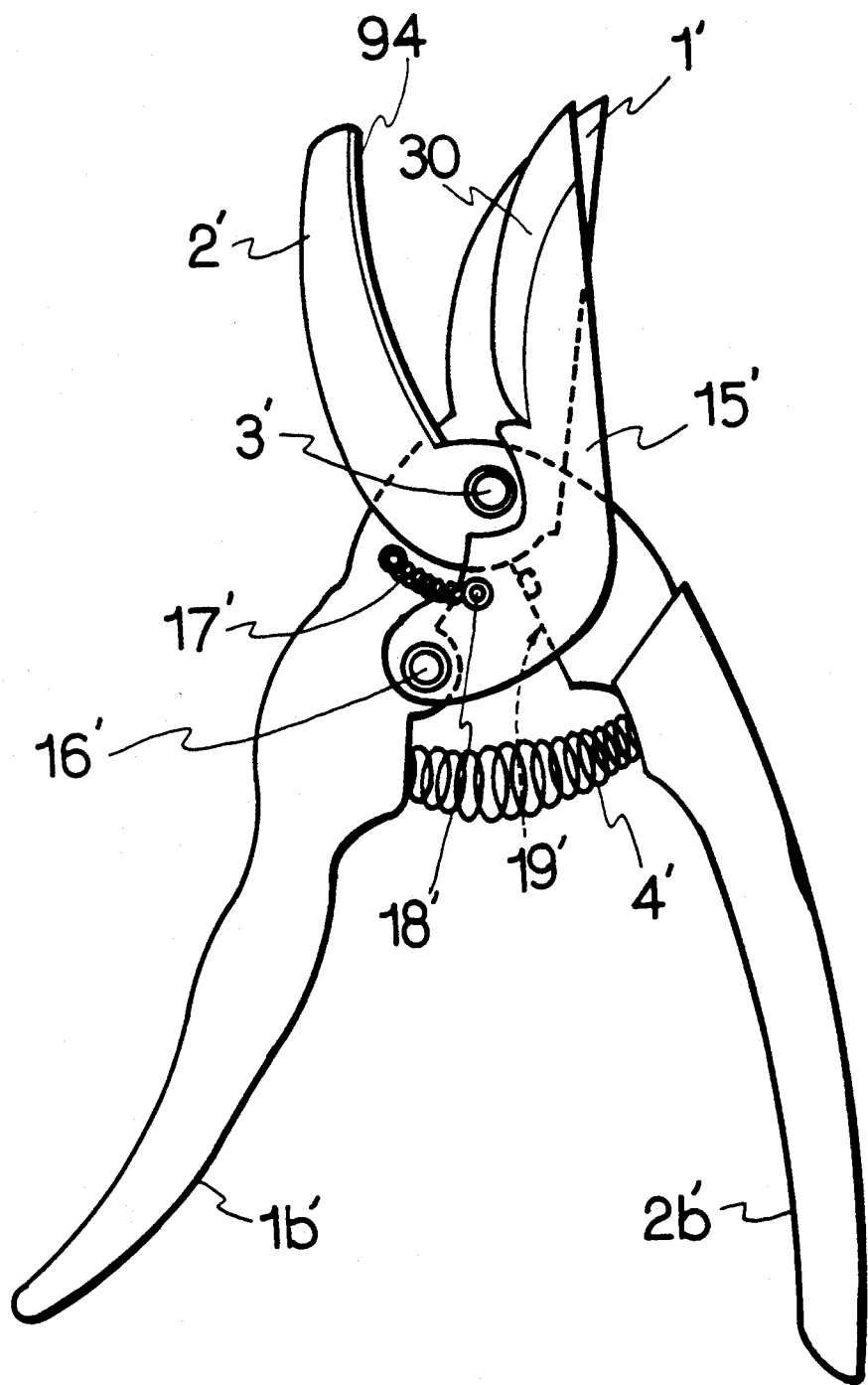
FIG. 6 is the drawing of the prior art U.S. Pat. No. 4,117,592.

The cutting edges (112, 122) of the shears, which are ahead of the clipping tongs (312, 322), are used to prune the stems. In other words, the same pair of shears can be used to trim the stem of the fruit cut down from its tree, without the need of changing to another pair of shears or pass on the job to another person. Besides, the protruding cutting edges (112, 122) and the clipping tongs (312, 322) can be overlapped in the shape of an arc, as shown by FIG. 5 to pick and trim special flowers and fruits.

I claim:

1. A pair of shears comprising:
a pair of shear plates in overlapping relationship mounted together so as to pivot with respect to each other, one end of each of said shear plates defining a cutting edge, another end of each of said shear plates defining a handle, said shears plates having a hole therein for the receipt of a pivot member, said handle having a first rivet hole formed therein;
a pair of tong plates arranged in overlapping relationship so as to generally pivot with respect to each other, one end of each of said tong plates defining a tong member, another end of each of said tong plates defining a tong handle, said tong handle affixed to said handle of said shear plate, said tong plates having an elongated hole therein aligned with said hole of said shear plates, said pivot member extending through said hole of said shear plates and said elongated hole of said tong plates, said tong handle having a second rivet hole formed therethrough, each of said tong plates having a peg attached on said tong handle;
a rivet extending through said first rivet hole of said handle of said shear plates and through said second rivet hole of said tong handle;
a tension spring to said peg on each of said tong plates, said tension spring for urging said tong handle of one of said tong plates away from a tong handle of another of said tong plates.

2. The shears of claim 1, said cutting edge of said shear plates having a greater length than said tong member.

3. The shears of claim 2, said tong member disposed inwardly of said cutting edge.

4. The shears of claim 1, said pivot member slidably movable across said elongated hole, said elongated hole having a larger area than said hole of said shear plates.

5. The shears of claim 1, said tong member having a bend at a tip of said tong member.

6. The shears of claim 1, said shear plates and said tong plates having an arc configuration.

* * * * *